(12) United States Patent
Isoyama et al.

(10) Patent No.: US 6,570,873 B1
(45) Date of Patent: May 27, 2003

(54) SYSTEM AND METHOD FOR SCHEDULING RESERVATION OF TRAFFIC WITH PRIORITY

(75) Inventors: Kazuhiko Isoyama, Tokyo (JP); Toshiya Aramaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/438,397

(22) Filed: Nov. 12, 1999

(30) Foreign Application Priority Data

Nov. 13, 1998 (JP) .......................................... 10-324081

(51) Int. Cl.⁷ .............................................. H04L 12/56
(52) U.S. Cl. .................. 370/375; 370/395.42; 370/415; 340/825.41
(58) Field of Search ........................... 370/395.2, 395.4, 370/395.41, 395.43, 229, 230, 235, 412–418, 375, 376, 377, 395.42; 340/825.41

(56) References Cited

U.S. PATENT DOCUMENTS 5,299,190 A * 3/1994 LaMaire et al. ............ 370/413
6,160,812 A * 12/2000 Bauman et al. ............. 370/416
6,301,253 B1 * 10/2001 Ichikawa ................ 370/395.71
6,359,861 B1 * 3/2002 Sui et al. .................... 370/230

FOREIGN PATENT DOCUMENTS

| JP | 06-216929 | 8/1994 |
|---|---|---|
| JP | 2737735 | 1/1998 |
| JP | 10-200550 | 7/1998 |

* cited by examiner

*Primary Examiner*—Seema S. Rao
*Assistant Examiner*—Melanie Jagannathan
(74) *Attorney, Agent, or Firm*—Foley & Lardner

(57) ABSTRACT

Disclosed is a system for scheduling reservation of traffic with priority, in which each of input ports detects the reserved addressed output port for a high priority traffic by detecting signaling of the traffic and notifies the reserved addressed output port to a scheduler, the scheduler sets a switch connection for passing the high priority traffic with priority every time slot and assigns other switch connections to best effort traffics, and when the switch connections are determined, outputs grant signals to input ports and setting signal to a switch.

6 Claims, 8 Drawing Sheets

F I G. 5

SYSTEM AND METHOD FOR SCHEDULING RESERVATION OF TRAFFIC WITH PRIORITY

BACKGROUND OF THE INVENTION

1. Field of the Invention

The present invention relates to a packet switch which is used in the Internet communication or the like.

2. Description of the Prior Art

The data traffic in the conventional Internet adopts best effort method and the quality of service (hereinafter, referred to as QoS) of the traffic with respect to a bandwidth, delay, fluctuation, or the like was not considered. That is, when routers and switches (hereinafter, both a router and a switch are referred to as packet switches) receive IP packets to be forwarded, they only forward the packets with QoS which may be provided at each time.

However, with the advents of protocols of RSVP (Reservation Protocol) and DiffServ (Differentiated Service), the QoS of traffic comes to be assured for protocol in the Internet. In addition, a packet switch comes to assure the QoS while classifying traffic by QoS as disclosed in JP 10-200550, A.

Moreover, with the advent of VoIP (Voice over IP), the Internet comes to accommodate telephone voices, and also, there is a trend that telephone service providers establish a conventional PSTN on the Internet. Therefore, the condition which is required to assure QoS in the Internet becomes rigorous.

However, because a conventional packet switch begins the scheduling thereof after a traffic arrives at the switch, it was difficult for the conventional packet switch to realize the QoS which assures the quality of a telephone voice.

When a packet switch forwards a packet, the packet switch must set a switch connection therein in order to transfer the traffic from a certain input port to a certain output port, and in addition, scheduling to arbitrate the contention between switch connections which are set for plural input ports is necessary for the switch.

Referring to FIG. 6 showing a conventional packet switch, when each of input ports 41a and 41b receives data addressed to any of output ports 44a and 44b, each of input ports 41a and 41b queues the data to queue 45 which is provided for each output port, and outputs a request for a connection with a addressed output port to scheduler 42 in order to request a connection realized in switch 43. Scheduler 42 looks over the requests for the connections which are received from input ports 41a and 41b, and allocates each output port to each input port so that connections between input ports 41a, 41b and output ports 44a, 44b do not contend with each other. Scheduler 42 sets switch 43 in accordance with the allocations, and outputs GRANT signals for allowing input ports 41a and 41b to output data to addressed output port 44a or 44b. Each of input ports 41a and 41b transmits data which are addressed to the notified destination output port to switch 43, and switch 43 switches the inputted data to output port 44a or 44b.

The scheduling of the conventional packet switch will be explained with reference to FIGS. 7, and 8. It is assumed that the VOQ (Virtual Output Queue) method is adopted. In accordance with the VOQ method, when an input port receives plural data, the input port is able to simultaneously output plural requests. Each of the plural requests is for a connection with an output port.

Referring to FIG. 7, scheduler 42 comprises request matrix generator 52, scheduling algorithm portion 53, and allocation matrix processor 54. Request matrix generator 52 generates a request matrix which represents the status of connection requests by two dimensions, one of which consists of input ports and the other of which consists of output ports, on the basis of requests from input ports. Scheduling algorithm portion 53 performs scheduling on the basis of the request matrix, and generates an allocation matrix which represents the setting of switch 43 by two dimensions, one of which consists of input ports and the other of which consists of output ports. Allocation matrix processor 54 generates a setting signal to be supplied to switch 43 and the GRANT signals to be supplied to input ports 41a, and 41b on the basis of the allocation matrix.

Referring to FIG. 8, request matrix 62 is a two dimensional matrix consisting of input ports and output ports. If a certain input port outputs a request for a connection with a certain output port, the value of the cross point of the input port and the output port becomes one. The example of the request matrix 62 in FIG. 8 shows that input port 0 is requesting connections with output ports 0, and 3, input port 1 is requesting connections with output ports 1, and 2, input port 2 is requesting connections with output ports 1, and 3, and input port 3 is requesting connections with output ports 0, 1, and 2. Scheduling algorithm 61 performs scheduling on the basis of request matrix 62. In this case, only a single connection between an input port and an output can be established for each input port and each output port. Therefore, allocation matrix 64 is generated in such a way that a request bit is adopted from the upper leftmost corner to the lower rightmost corner sequentially, and a request bit which is located in a row which already has an adopted request bit or/and in a column which already has the adopted request bit or another adopted request bit will not be adopted. Allocation matrix 64 is a two dimensional matrix consisting of input ports and output ports and if a connection between a certain input port and a certain output port is determined to be adopted, the value of the cross point of the input port and the output port becomes one.

However, it is not possible to schedule a high priority traffic which is required for a telephone voice or the like with a priority when the above scheduling method is used. There is a second method in which scheduling is performed for high priority traffics and the result of the scheduling is adopted with a priority. However, according to the second method, if requests with priorities contend with each other, timing of allocation becomes irregular, thereby causing a fluctuation of a traffic.

SUMMARY OF THE INVENTION

In order to overcome the aforementioned disadvantages, the present invention has been made and accordingly, has an object to provide a system and method for scheduling reservation with priority, which system and method beforehand reserve a scheduling of a switch for a traffic of telephone voice or the like of which priority is high and of which pattern (a pattern as to when a packet belonging to the traffic arrives and as to where the packet is switched) is forecastable by use of connection information (information as to the bandwidth of the traffic, the arrival time of the traffic, the destination of switching of the packet and the like), and thereby enabling to ensure QoS for such a traffic.

That is, the present invention has an object to perform such scheduling that assigns a switch setting with priority to a data traffic of which reception time is forecastable in a packet switch or a cell switch which has a buffer for preventing contentions among packets at the output.

According to an aspect of the present invention, there is provided a system for scheduling a reservation of a traffic with a priority, wherein packets belonging to a high priority traffic are forwarded from an input port to an output port in accordance with the reservation, the system comprising: input ports, each of the input ports comprising: queues which input inputted packets while classifying the inputted packets by addressed output ports and priorities into the queues and output the inputted packets individually when receiving a grant signal; means for obtaining and outputting connection information including a request for reserving a connection of such input port with an addressed output port for packets belonging to the high priority traffic on the basis of signaling of the high priority traffic; and means for outputting a request for a connection of such input port with an addressed output port for a low priority packet; output ports which output packets received from the input ports; a switch which connects the input ports and the output ports; and a scheduler which controls the switch by a setting signal; wherein the scheduler comprises: a schedule generator which determines, on the basis of each request for reserving a connection which is received from one of the input ports, a value of each element of each of priority reservation allocation matrices which are provided for every time slot and have the numbers of the input ports as numbers of rows thereof and numbers of the output ports as numbers of columns thereof; a priority reservation table which stores the priority reservation allocation matrices for every time slot; a priority reservation reader which reads each of the priority reservation allocation matrices from the priority reservation table every time slot; a request matrix generator which determines, on the basis of the requests for connections which are received from each of the input ports, a value of each element of a request matrix, the request matrix having the numbers of the input ports as numbers of rows thereof and numbers of the output ports as numbers of columns thereof; a request matrix masking portion which masks the request matrix on the basis of each of the priority reservation allocation matrices which is read every time slot to generate a masked request matrix; a scheduling algorithm portion which performs scheduling on the basis of the masked request matrix in order to generate an allocation matrix; an allocation matrix multiplexer which adds the allocation matrix and the priority reservation allocation matrix together in order to generate a final allocation matrix; and an allocation matrix processor which generates the grant signal and the setting signal on the basis of the final allocation matrix.

The request matrix generator may activate an element of the request matrix at which a row corresponding to an input port which has outputted the request for a connection and a column corresponding to an addressed output port which is specified by the request for a connection cross each other.

The schedule generator may activate an element of the priority reservation allocation matrix at which a row corresponding to an input port which has outputted the request for reserving a connection and a column corresponding to an addressed output port which is specified by the request for reserving a connection cross each other.

The request matrix masking portion may mask the request matrix by inactivating elements of the request matrix which are included in a row which includes an element at which a row corresponding to an input port which has outputted the request for reserving a connection and a column corresponding to an addressed output port which is specified by the request for reserving a connection cross each other, and inactivating elements of the request matrix which are included in a column which includes the element at which the row corresponding to the input port which has outputted the request for reserving a connection and the column corresponding to the addressed output port which is specified by the request for reserving a connection cross each other.

The scheduling algorithm portion may leave one element active and deactivate other elements among elements of the masked request matrix which belong to a common row and are simultaneously active, and leaves one element active and deactivates other elements among elements of the masked request matrix which belong to a common column and are simultaneously active in order to generate the allocation matrix.

These and other objects, features and advantages of the present invention will become more apparent in the light of the following detailed description of the best mode embodiments thereof, as illustrated in the accompanying drawings.

BRIEF DESCRIPTION OF THE DRAWINGS

FIG. 5 is a conceptual diagram for explanation of the operation of the scheduler as shown in FIG. 1 according to the first and second embodiment of the present invention;

DETAILED DESCRIPTION OF THE PREFERRED EMBODIMENTS

Figure 1:
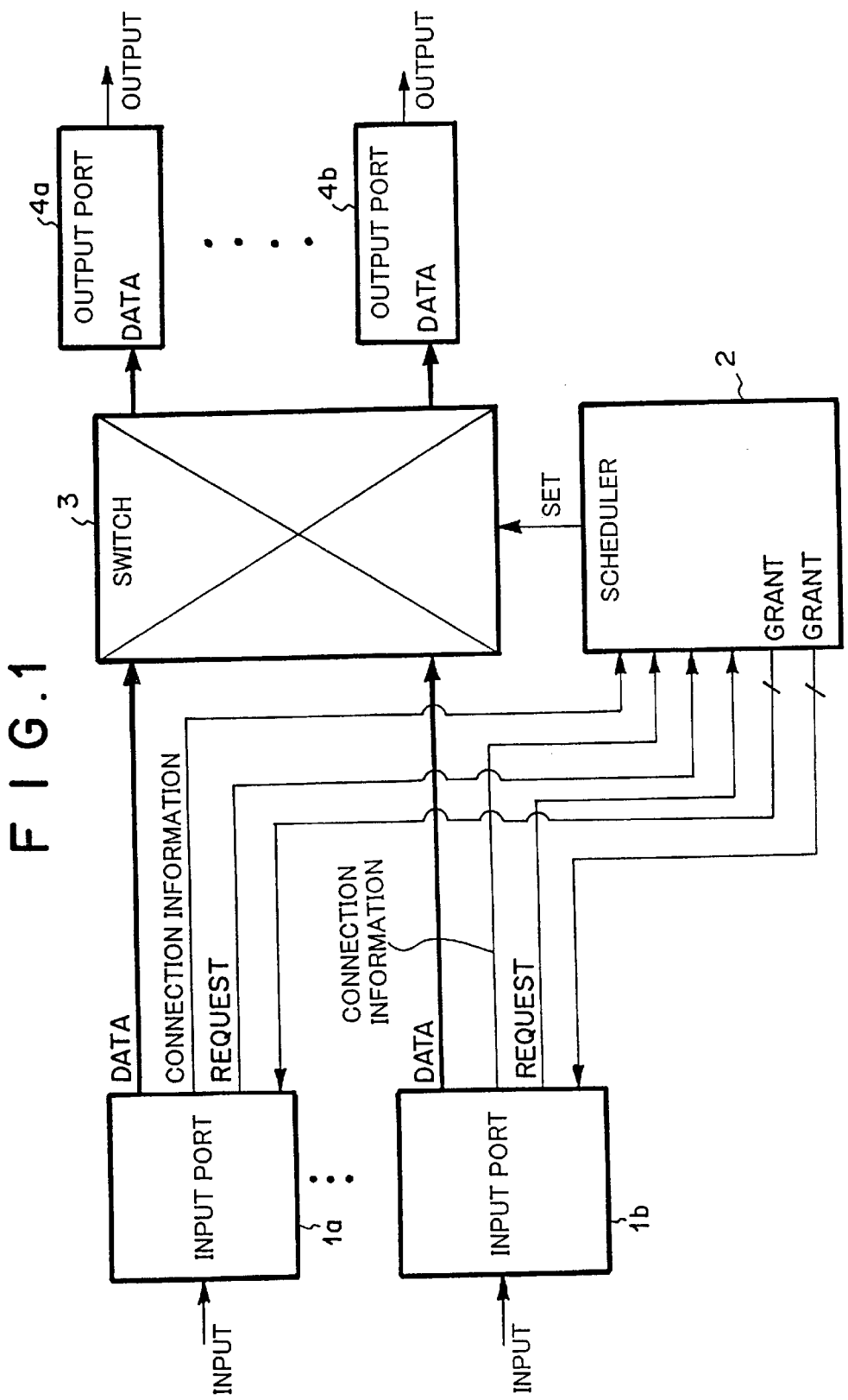
FIG. 1 is a block diagram showing the structure of the system for scheduling reservation of traffic with priority according to a first embodiment of the present invention.

Preferred embodiments according to the present invention will be described with reference to the accompanying drawings.

According to the present invention, in case of telephone traffic or the like, because such traffic is connection oriented (or secures a connection before transmitting packets), by noticing that the occurrence of such traffic is beforehand recognizable by signaling (exchange of signals to ensure a connection for a traffic before sending the packets of the traffic) or the like and that the arrival time of such traffic is forecastable as the traffic pattern is CBR (Constant Bit Rate), the scheduling of a packet switch for such traffic is beforehand reserved and set, and accordingly such traffic can surely pass through the packet switch at the time slot thus set, thereby ensuring QoS of such traffic and minimizing a fluctuation of such traffic.

Figure 5:
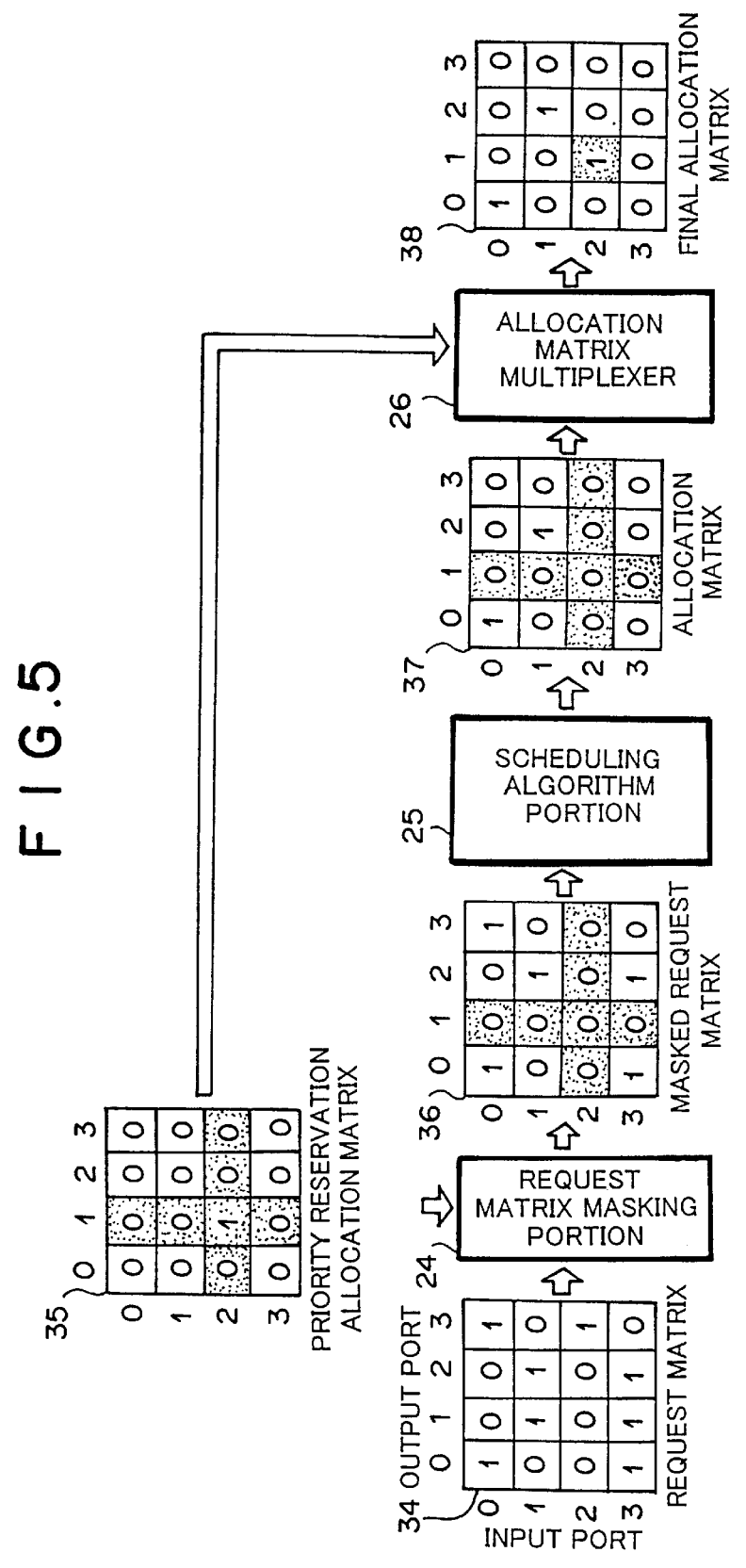

The principle of the present invention is shown in FIG. 5.

In the present invention, for a conventional traffic of best effort or the like, an input port outputs a request for a connection with an addressed output port and request matrix 34 representing the relation between input ports and output ports is generated after the arrival of the conventional traffic similarly to the prior art. In addition, an assignment of a switch is beforehand reserved for a high priority traffic which is forecastable, and the assignment is read out as priority reservation allocation matrix 35 at the time slot when the high priority traffic arrives. Request mask portion 104 masks request matrix 34 on the basis of priority reservation allocation matrix 35. Scheduling algorism portion 105 performs scheduling on the basis of request matrix 36 which has been masked, so that allocation matrix 37 is generated. Allocation matrix multiplexer 106 adds allocation matrix 37 and priority reservation allocation matrix 35 together in order to generate a final allocation matrix 38.

Therefore, the traffic which reserved a switch with a priority can be surely assigned a switch at the time slot thereof.

A First Embodiment

Figure 2:
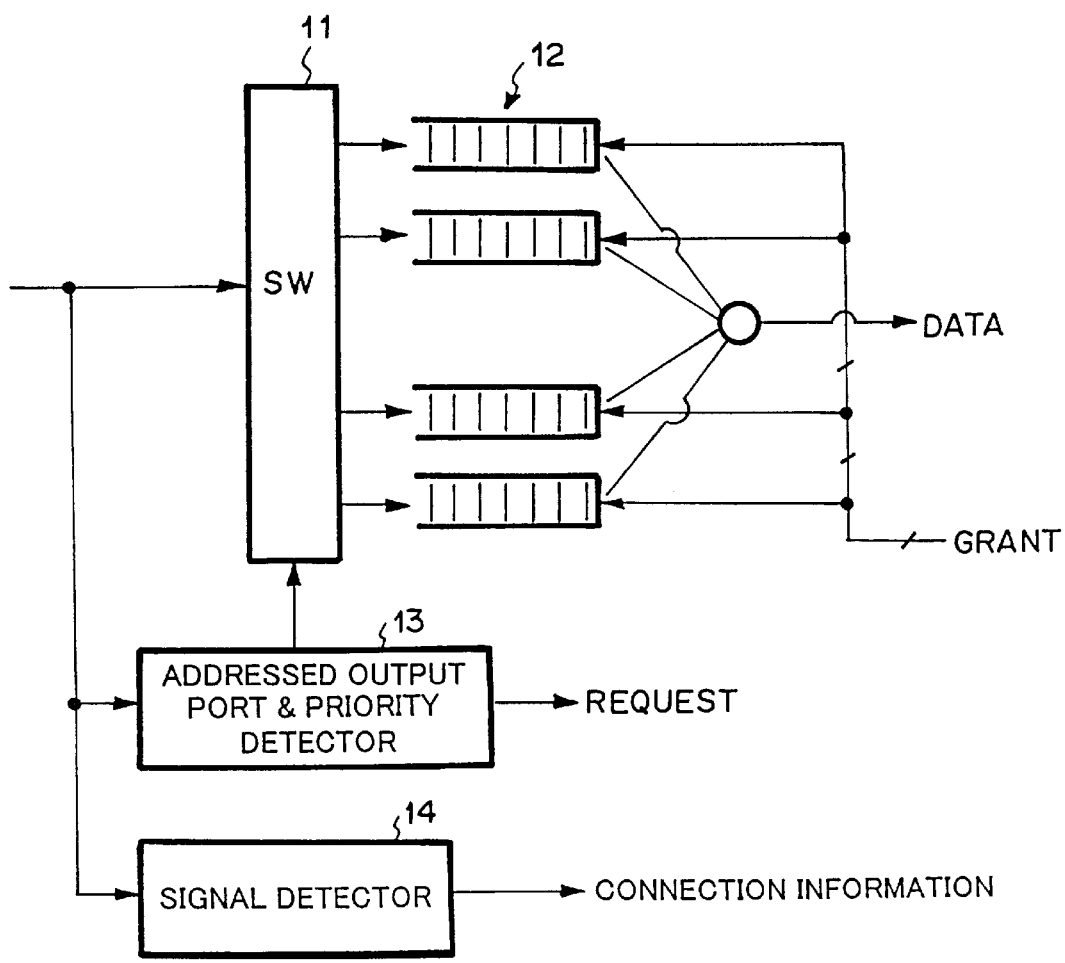
FIG. 2 is a block diagram showing the structure of the input port as shown in FIG. 1.

Referring to FIGS. 1, and 2, when each of input ports 1a and 1b detects a signaling of a connection oriented traffic addressed to output port 4a or 4b by signal detector 14, each of input ports 1a and 1b notifies connection information obtained from the signaling to scheduler 2. Scheduler 2 beforehand performs scheduling on the basis of the connection information so that the traffic is assigned a switch at the arrival time of the traffic of the connection.

Each of input ports 1a and 1b comprises queues 12, each of which is provided for each output port and is additionally separated into a queue for connection oriented traffics and a queue for best effort traffics. When each of input ports 1a and 1b receives a connection oriented traffic, addressed output port & priority detector 13 detects the addressed output port and that the traffic is connection oriented, switch 11 changes its connection in accordance with such detected matters, and the traffic is queued to the queue which is provided for connection oriented traffics to be forwarded to the addressed output port among queues 12. The connection oriented traffic which has been queued is assigned a switch in compliance with characteristics of the traffic according to a reservation scheduling and forwarded to the addressed output port when the assignment is notified by a GRANT signal.

In addition, when each of input ports 1a and 1b receives a best effort traffic addressed to output port 4a or 4b, addressed output port & priority detector 13 detects the addressed output port and that the traffic is of best effort, switch 11 changes its connection in accordance with such detected matters, the traffic is queued to a queue which is provided for best effort traffics to be forwarded to the addressed output port among queues 12, and each of input ports 1a and 1b outputs a request for a connection with the addressed output port to scheduler 2. Scheduler 2 performs scheduling in response to the request and when a switch is assigned to the traffic, scheduler 2 notifies to each of input ports 1a and 1b that the switch is assigned to the traffic by sending a GRANT signal to each of input ports 1a and 1b. Each of input ports 1a and 1b transmits data addressed to the notified addressed output port to switch 3, and switch 3 performs switching of the traffic to any of output ports 4a and 4b.

Next, the details of scheduler 2 will be explained with reference to FIG. 3. Scheduler 2 of this embodiment comprises scheduler core 101 and priority reservation scheduling controller 102.

Priority reservation schedule controller 102 comprises priority reservation table 108, priority reservation reader 109, and schedule reservation portion 110.

Schedule reservation portion 110 performs scheduling on the basis of connection information from each input port so that the traffic characteristics of each connection are satisfied. For example, if a certain traffic is of CBR, scheduling is performed so that a switch is assigned at time slots at constant time intervals in conformity with the rate thereof. Schedule reservation portion 110 writes the result of scheduling as priority reservation allocation matrices, each of which represents a switch setting for each time slot, to priority reservation table 108.

Priority reservation table reader 109 reads the priority reservation allocation matrix which is provided for each time slot from priority reservation table 108 and notifies the priority reservation allocation matrix which is provided for each time slot to scheduler core 101.

Scheduler core 101 comprises request matrix generator 103, request matrix masking portion 104, scheduling algorithm portion 105, allocation matrix multiplexer 106, and allocation matrix processor 107. Request matrix generator 103 generates, on the basis of requests received from input ports, a request matrix which is expressed by the numbers of the input ports and the numbers of the output ports and which represents the status of requests for connections. Request matrix masking portion 104 masks the request matrix which has been generated in request matrix generator 103 on the basis of the priority reservation allocation matrix which has been received from priority reservation schedule controller 102. Scheduling algorithm portion 105 performs scheduling on the basis of the masked request matrix in order to generate an allocation matrix which represents settings of switch 3 by relations between input ports and output ports. Allocation matrix multiplexer 106 adds the allocation matrix which has been generated in scheduling algorithm portion 105 and the priority reservation allocation matrix which has been generated in priority reservation scheduling controller 102 together in order to generate a final allocation matrix. Allocation matrix processor 107 generates, on the basis of the thus synthesized final allocation matrix, a setting signal to be supplied to switch 3 and GRANT signals to be supplied to input ports.

The operation of the scheduling executed in scheduler 2 according to this embodiment of the present invention will be explained with reference to FIG. 5

In this embodiment, with respect to conventional traffics of best effort or the like, each of input ports outputs a request for a connection with the addressed output port for each traffic at time slot when each traffic arrives, and request matrix generator 103 generates request matrix 34 representing relations between input ports and output ports in accordance with the requests. Request matrix 34 is a two dimensional matrix consisting of input ports and output ports. If a certain input port outputs a request for a connection with a certain output port, the cross point of the input port and the output ports in request matrix 34 becomes one (or active). All of such cross points become one (or active) and other parts in request matrix 34 become zero (or inactive). In the case of request matrix 34 exemplified as shown in FIG. 5, input port 0 is outputting requests for connections with output ports 0, and 3, input port 1 is outputting requests for connections with output ports 1, and 2, input port 2 is outputting a request for a connection with output port 3, and input port 3 is outputting requests for connections with output ports 0, 1, and 2.

Besides, with respect to a high priority traffic which is forecastable, assignment of switch 3 is beforehand reserved and set in priority reservation table 108. Priority reservation table reader 109 reads the assignment as priority reservation allocation matrix 35 at the time slot when the traffic arrives. In priority reservation allocation matrix 35, the relation of the input port and output port for which the assignment of switch 3 is reserved is represented by the matrix, and in this exemplified case, the connection between input port 2 and output port 1 is reserved.

Request matrix masking portion 104 masks request matrix 34 on the basis of priority reservation allocation matrix 35. Because the input port which is reserved cannot be connected with the other output ports than the reserved output port, the requests in the row corresponding to the input port in request matrix 34 are masked (or inactivated). Similarly, the output port which is reserved cannot be connected with the other input ports than the reserved input port, the requests in the column corresponding to the output port in request matrix 34 are masked (or inactivated). In this case, the requests in the row corresponding to input port 2 and in the column corresponding to output port 1 are masked (or inactivated).

Scheduling algorithm portion 105 performs scheduling on the basis of masked request matrix 36 in order to generate allocation matrix 37. Allocation matrix 37 is a two dimensional matrix consisting of input ports and output ports. If a connection with a certain input port and a certain output port is determined, the corresponding part becomes one. In case of allocation matrix 37 exemplified as shown in FIG. 5, the connection between input port 0 and output port 0, and the connection between input port 1 and output port 2 are determined. In this case, though there are two active columns (the column corresponding to output port 0 and the column corresponding to output port 3) for the row corresponding to input port 0 in masked request matrix 36, one column (the column corresponding to output port 0) is kept active while the other column(s) (the column corresponding to output port 3) is inactivated to generate allocation matrix 37. The duplication in the row corresponding to input port 3, the duplication in the column corresponding to output port 0, and the duplication in the column corresponding to output port 2 are similarly processed.

Allocation matrix multiplexer 106 adds allocation matrix 37 and priority reservation allocation matrix 35 together in order to generate final allocation matrix 38. In the case of final allocation matrix 38 exemplified as shown in FIG. 5, the connections determined by the scheduling algorithm; that are, the connection between input port 0 and output port 0, and the connection between input port 1 and output port 2, and the connection which has been reserved by the priority reservation; that is, the connection between input port 2 and output port 1, are determined as the final switch connections.

A Second Embodiment

Figure 4:
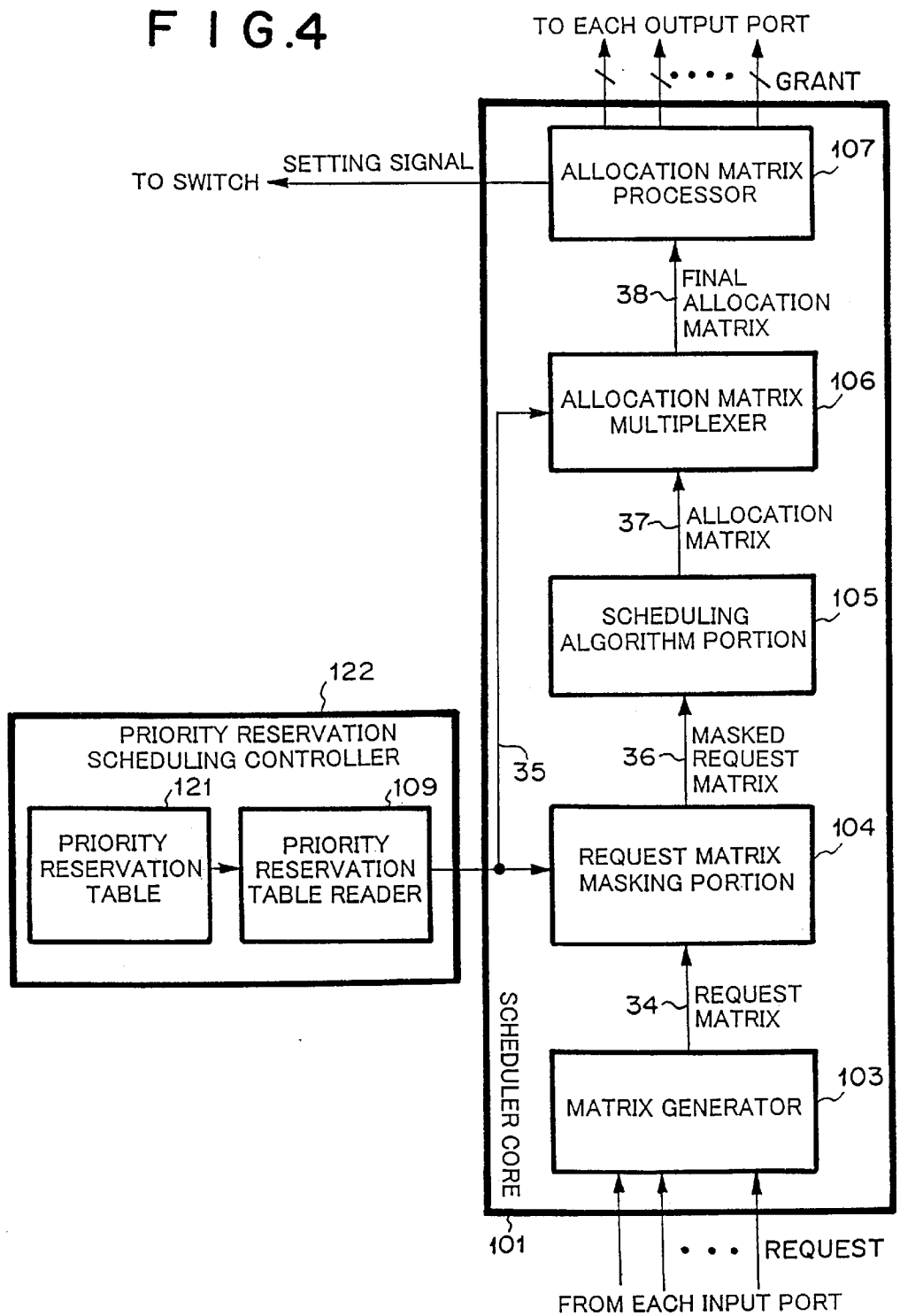
FIG. 4 is a block diagram showing the structure of the scheduler as shown in FIG. 1 according to a second embodiment of the present invention.
Figure 6:
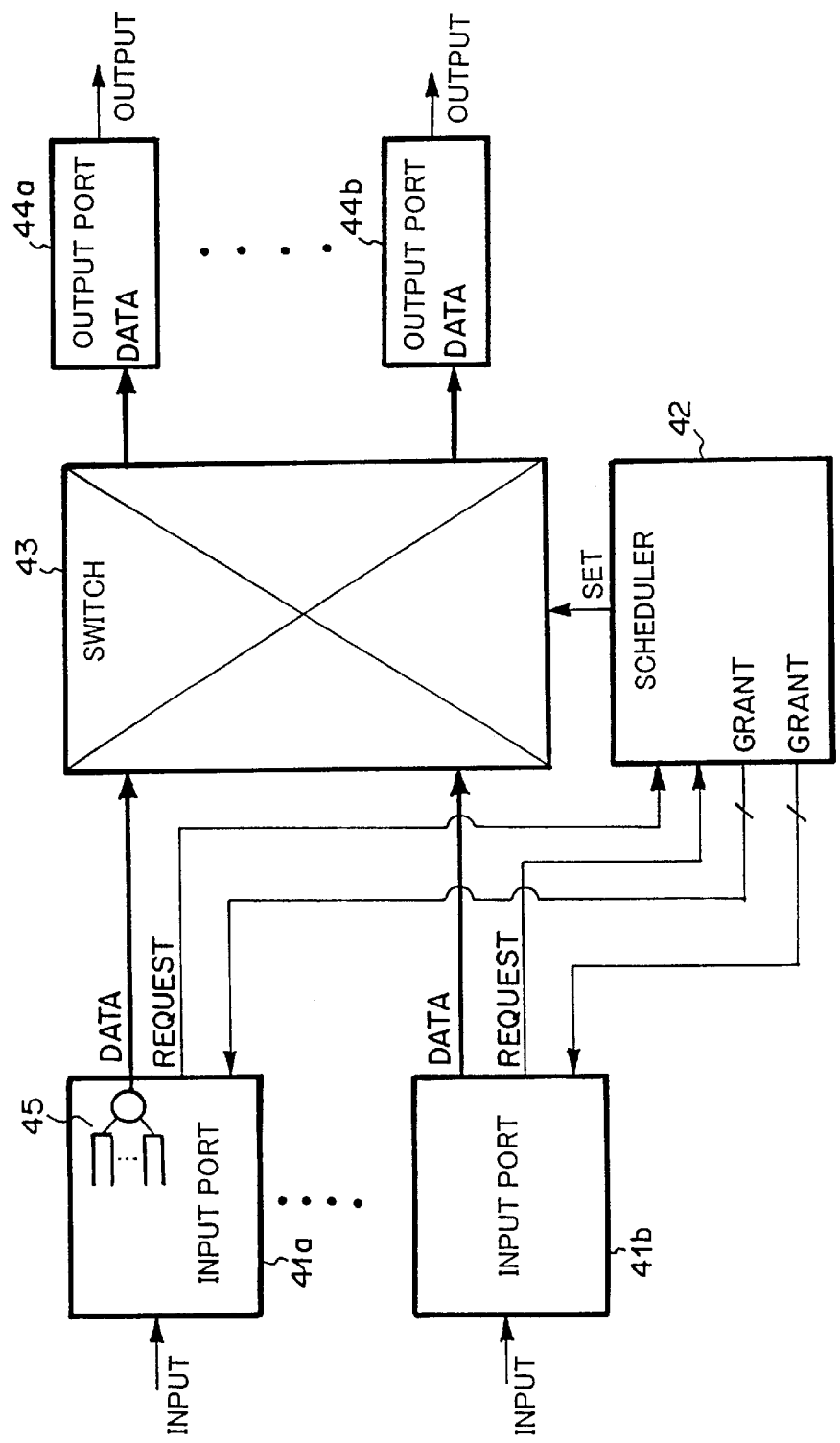
FIG. 6 is a block diagram showing the structure of a conventional packet switch.
Figure 7:
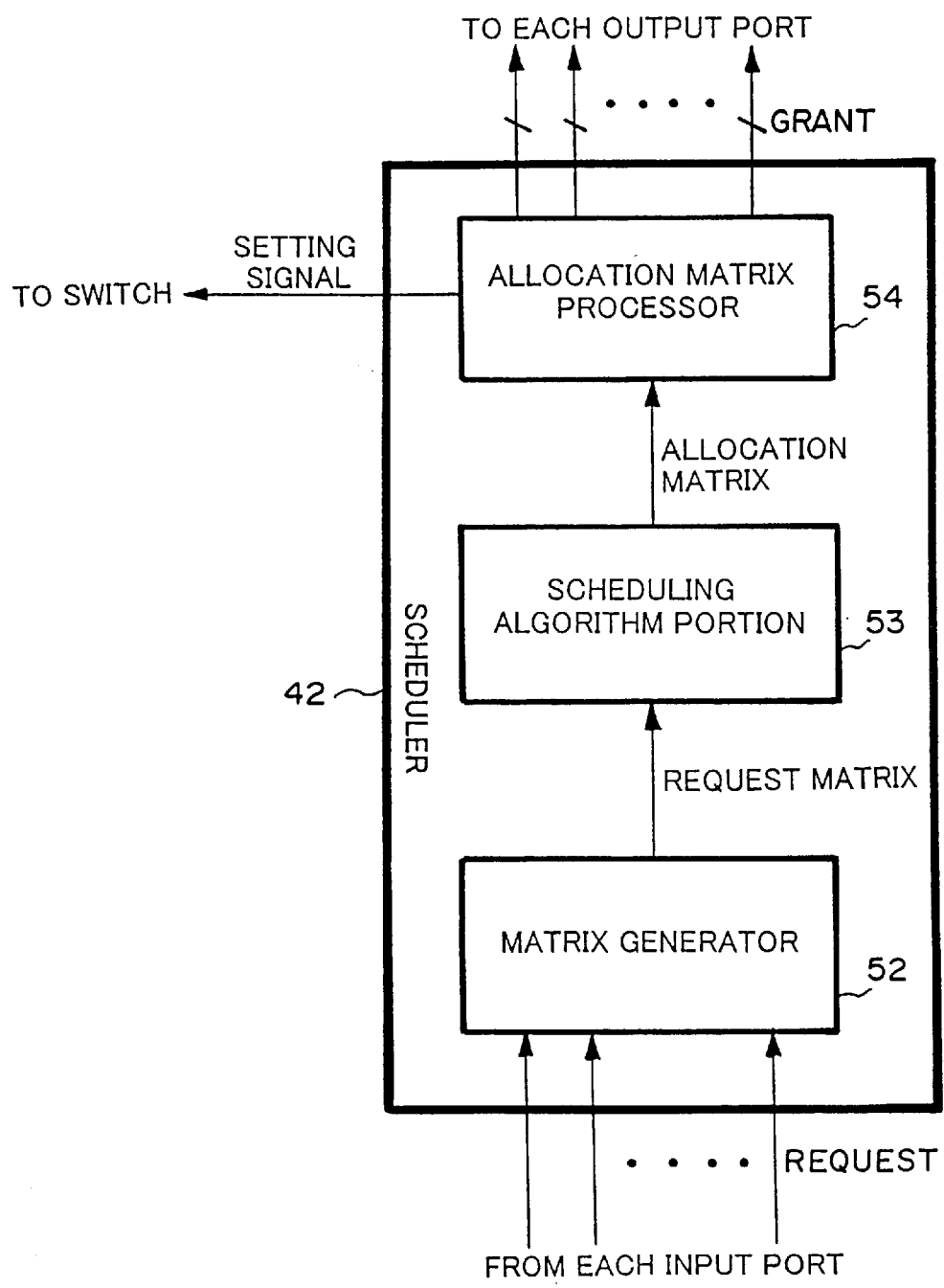
FIG. 7 is a block diagram showing the structure of the scheduler as shown in FIG. 6.
Figure 8:
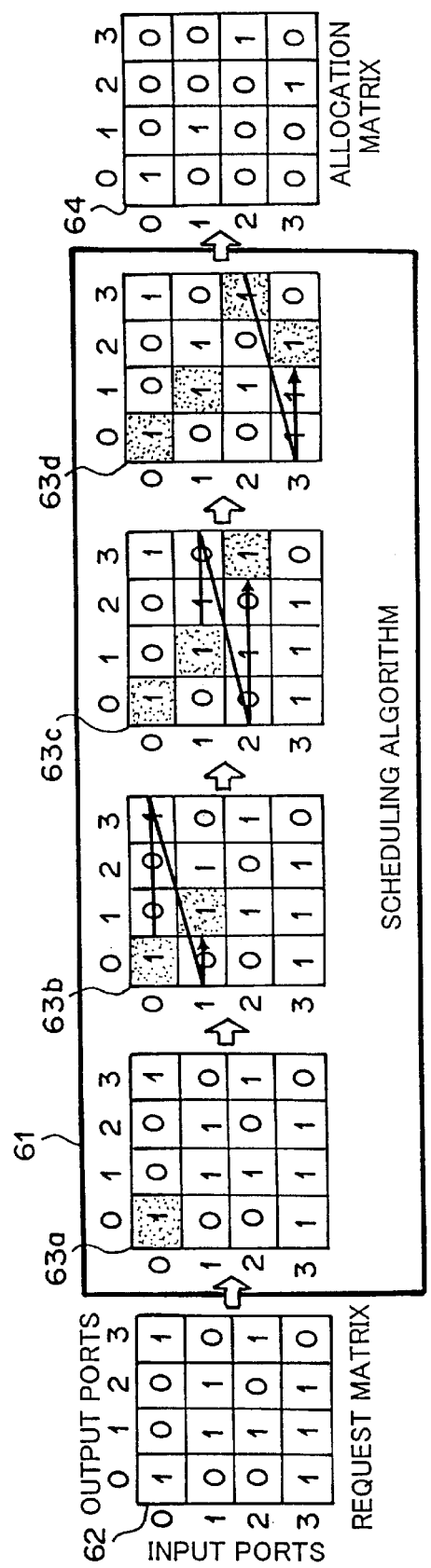
FIG. 8 is a conceptual diagram for explanation of the operation of the scheduler as shown in FIG. 6.

FIG. 4 shows scheduler 2 according to the second embodiment of the present invention.

Figure 3:
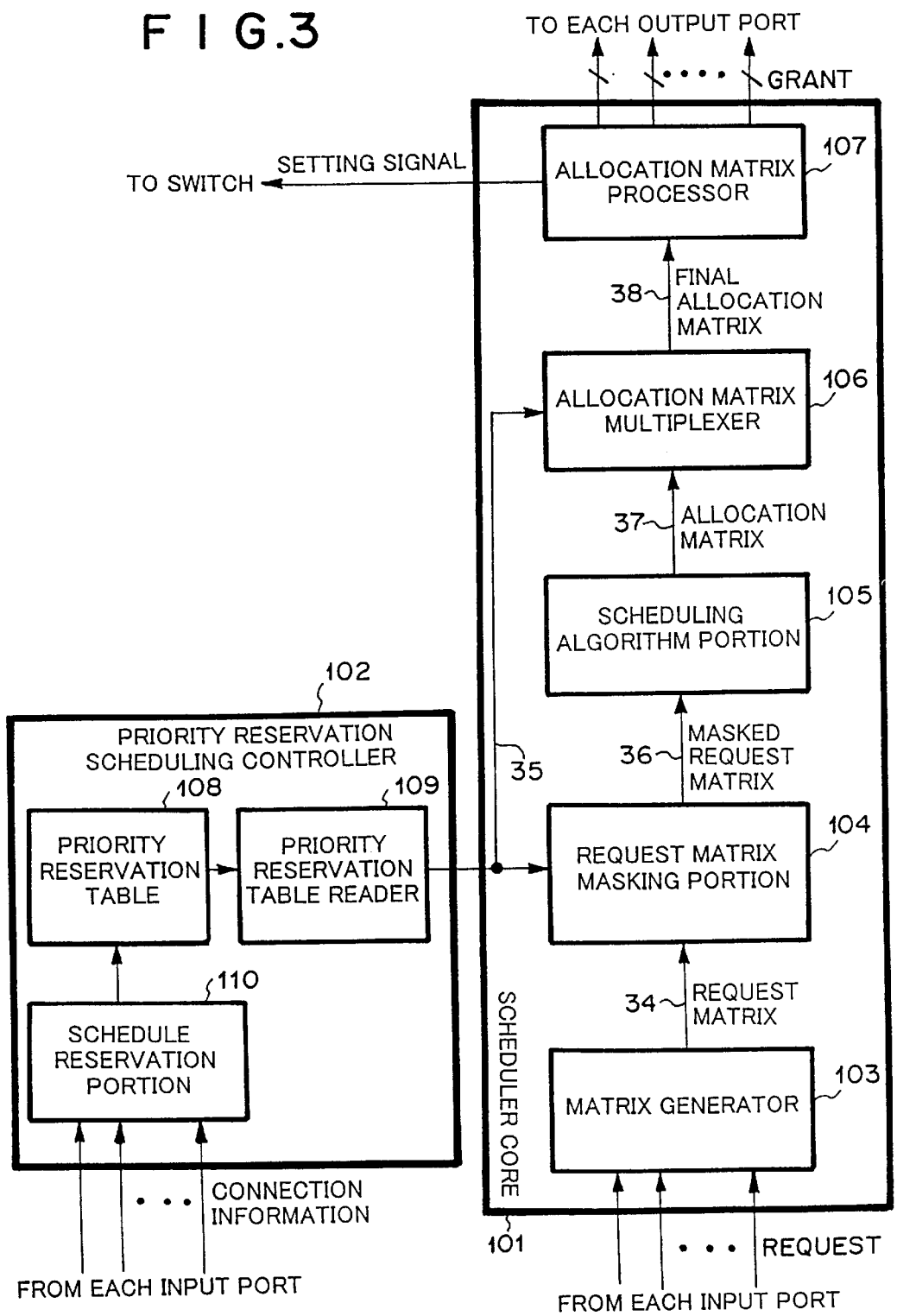
FIG. 3 is a block diagram showing the structure of the scheduler as shown in FIG. 1 according to the first embodiment of the present invention.

The reservation scheduling is executed on the basis of connection information from each input port according to the first embodiment as shown in FIG. 3. However, the prescribed values are beforehand set to priority reservation table 121 in this embodiment as shown in FIG. 4. Therefore, schedule reservation portion 110 is omitted in this embodiment, and priority reservation schedule controller 122 is different from priority reservation scheduling controller 102. Members in this embodiment which are the same as the first embodiment are referred to with the same references as the first embodiment and the duplicated explanation thereof is omitted.

For example, the prescribed values are set to priority reservation table 121 so that a certain input port and a certain output port are connected at constant time intervals, and telephone traffics which are accommodated in the Internet are switched through such input port and output port in the system of this embodiment. This enables to simplify the system.

As explained above, according to the present invention, the traffic which has reserved the connection of the switch with a priority is surely assigned the connection of the switch at the time slot of the reservation.

Among traffics for which this system is effective is a traffic which is connection oriented, is capable of being forecasted, and requires a high QoS. For example, in case that VoIP (Voice over IP) or a conventional telephone on the Internet is accommodated, the generation of the traffic thereof is able to be forecasted beforehand by detection of signaling of H.323, SS7, and because the traffic of a voice telephone is of CBR, the arrival time of the traffic is also able to be forecasted beforehand. Telephone traffics can coexists with the Internet traffics while keeping the quality of the telephone traffics by reserving the connection of switch with a priority for the telephone traffics in order to assign time slots to the telephone traffics as STM (Synchronous Transfer Mode) and scheduling the other resources of the switch for traffics of best effort.

Although the present invention has been shown and explained with respect to the best mode embodiments thereof, it should be understood by those skilled in the art that the foregoing and various other changes, omissions, and additions in the form and detail thereof may be made therein without departing from the spirit and scope of the present invention.

What is claimed is:

1. A system for scheduling a reservation of a traffic with a priority, wherein packets belonging to a high priority traffic are forwarded from an input port to an output port in accordance with the reservation, said system comprising:

input ports, each of said input ports comprising:

queues which input inputted packets while classifying said inputted packets by addressed output ports and priorities into said queues and output said inputted packets individually when receiving a grant signal;

means for obtaining and outputting connection information including a request for reserving a connection of such input port with an addressed output port for packets belonging to the high priority traffic on the basis of signaling of the high priority traffic; and means for outputting a request for a connection of such input port with an addressed output port for a low priority packet;

output ports which output packets received from said input ports;

a switch which connects said input ports and said output ports; and a scheduler which controls said switch by a setting signal;

wherein said scheduler comprises:

a schedule generator which determines, on the basis of each request for reserving a connection which is received from one of said input ports, a value of each element of each of priority reservation allocation matrices which are provided for every time slot and have the numbers of said input ports as numbers of rows thereof and numbers of said output ports as numbers of columns thereof;

a priority reservation table which stores said priority reservation allocation matrices for every time slot;

a priority reservation reader which reads each of said priority reservation allocation matrices from said priority reservation table every time slot;

a request matrix generator which determines, on the basis of said requests for connections which are received from each of said input ports, a value of each element of a request matrix, said request matrix having the numbers of said input ports as numbers of rows thereof and numbers of said output ports as numbers of columns thereof;

a request matrix masking portion which masks said request matrix on the basis of each of said priority reservation allocation matrices which is read every time slot to generate a masked request matrix;

a scheduling algorithm portion which performs scheduling on the basis of said masked request matrix in order to generate an allocation matrix;

an allocation matrix multiplexer which adds said allocation matrix and said priority reservation allocation matrix together in order to generate a final allocation matrix; and an allocation matrix processor which generates said grant signal and said setting signal on the basis of said final allocation matrix.

2. The system according to claim 1, wherein said request matrix generator activates an element of said request matrix at which a row corresponding to an input port which has outputted said request for a connection and a column corresponding to an addressed output port which is specified by said request for a connection cross each other;

wherein said schedule generator activates an element of said priority reservation allocation matrix at which a row corresponding to an input port which has outputted said request for reserving a connection and a column corresponding to an addressed output port which is specified by said request for reserving a connection cross each other;

wherein said request matrix masking portion masks said request matrix by inactivating elements of said request matrix which are included in a row which includes an element at which a row corresponding to an input port which has outputted said request for reserving a connection and a column corresponding to an addressed output port which is specified by said request for reserving a connection cross each other, and inactivating elements of said request matrix which are included in a column which includes the element at which the row corresponding to the input port which has outputted said request for reserving a connection and the column corresponding to the addressed output port which is specified by said request for reserving a connection cross each other; and wherein said scheduling algorithm portion leaves one element active and deactivates other elements among elements of said masked request matrix which belong to a common row and are simultaneously active, and leaves one element active and deactivates other elements among elements of said masked request matrix which belong to a common column and are simultaneously active in order to generate said allocation matrix.

3. A system for scheduling a reservation of a traffic with a priority, wherein packets belonging to a high priority traffic are forwarded from an input port to an output port in accordance with the reservation, said system comprising:

input ports, each of said input ports comprising:

queues which input inputted packets while classifying said inputted packets by addressed output ports and priorities into said queues and output said inputted packets individually when receiving a grant signal; and means for outputting a request for a connection of such input port with a addressed output port for a low priority packet;

output ports which output packets received from said input ports;

a switch which connects said input ports and said output ports; and a scheduler which controls said switch by a setting signal;

wherein said scheduler comprises:

a priority reservation table which stores priority reservation allocation matrices for every time slot, an element of each of priority reservation allocation matrices at which a row corresponding to an input port through which a packet belonging to said high priority traffic passes and a column corresponding to an output port through which the packet belonging to said high priority traffic passes being active;

a priority reservation table reader which reads each of said priority reservation allocation matrices from said priority reservation table every time slot;

a request matrix generator which determines, on the basis of said requests for connections which are received from each of said input ports, a value of each element of a request matrix, said request matrix having the numbers of said input ports as numbers of rows thereof and numbers of said output ports as numbers of columns thereof;

a request matrix masking portion which masks said request matrix on the basis of each of said priority reservation allocation matrices which is read every time slot in order to generate a masked request matrix;

a scheduling algorithm portion which performs scheduling on the basis of said masked request matrix in order to generate an allocation matrix;

an allocation matrix multiplexer which adds said allocation matrix and said priority reservation allocation matrix together in order to generate a final allocation matrix; and an allocation matrix processor which generates said grant signal and said setting signal on the basis of said final allocation matrix.

4. The system according to claim 3, wherein said request matrix generator activates an element of said request matrix at which a row corresponding to an input port which has outputted said request for a connection and a column corresponding to a addressed output port which is specified by said request for a connection cross each other;

wherein said request matrix masking portion masks said request matrix by inactivating elements of said request matrix which are included in a row which includes an element at which a row corresponding to an input port through which a packet belonging to said high priority traffic passes and a column corresponding to an addressed output port through which a packet belonging to said high priority traffic passes cross each other, and inactivating elements of said request matrix which are included in a column which includes the element at which the row corresponding to the input port which has outputted said request for reserving a connection and the column corresponding to the addressed output port which is specified by said request for reserving a connection cross each other; and wherein said scheduling algorithm portion leaves one element active and deactivates other elements among elements of said masked request matrix which belong to a common row and are simultaneously active, and leaves one element active and deactivates other elements among elements of said masked request matrix which belong to a common column and are simultaneously active in order to generate said allocation matrix.

5. A method for scheduling a reservation of a traffic with a priority, wherein packets belonging to a high priority traffic are forwarded from an input port to an output port in accordance with the reservation, said method comprising:

a step of generating a request matrix, an element of said request matrix at which a row corresponding to an input port which outputs a request for a connection of such input port with a first addressed output port for a low priority packet and a column corresponding to said first addressed output port cross each other being active;

a step of generating a priority reservation allocation matrix, an element of said priority reservation allocation matrix at which a row corresponding to an input port which outputs a request for reserving a connection of such input port with a second addressed output port for packets belonging to the high priority traffic and a column corresponding to said second addressed output port cross each other being active;

a step of masking said request matrix to generate a masked request matrix by inactivating elements of said request matrix which are included in a row which includes an element at which a row corresponding to an input port which has outputted said request for reserving a connection and a column corresponding to the second addressed output port which is specified by said request for reserving a connection cross each other, and inactivating elements of said request matrix which are included in a column which includes the element at which the row corresponding to the input port which has outputted said request for reserving a connection and the column corresponding to the second addressed output port which is specified by said request for reserving a connection cross each other;

a step of generating an allocation matrix by leaving one element active and deactivating other elements among elements of said masked request matrix which belong to a common row and are simultaneously active, and by leaving one element active and deactivating other elements among elements of said masked request matrix which belong to a common column and are simultaneously active;

a step of generating a final allocation matrix by adding said allocation matrix and said priority reservation allocation matrix together; and a step of connecting an input port and output port which correspond to an active element in said final allocation matrix.

6. A method for scheduling a reservation of a traffic with a priority, wherein packets belonging to a high priority traffic are forwarded from an input port to an output port in accordance with the reservation, said method comprising:

a step of generating a request matrix, an element of said request matrix at which a row corresponding to an input port which outputs a request for a connection of such input port with an addressed output port for a low priority packet and a column corresponding to such addressed output port cross each other being active;

a step of generating a priority reservation allocation matrix, an element of said priority reservation allocation matrix at which a row corresponding to an input port through which a packet belonging to said high priority traffic passes and a column corresponding to an output port through which the packet belonging to said high priority traffic passes cross each other being active;

a step of masking said request matrix to generate a masked request matrix by inactivating elements of said request matrix which are included in a row which includes an element at which a row corresponding to an input port through which a packet belonging to said high priority traffic passes and a column corresponding to an output port through which the packet belonging to said high priority traffic passes cross each other, and inactivating elements of said request matrix which are included in a column which includes the element at which the row corresponding to the input port through which the packet belonging to said high priority traffic passes and the column corresponding to the output port through which the packet belonging to said high priority traffic passes cross each other;

a step of generating an allocation matrix by leaving one element active and deactivating other elements among elements of said masked request matrix which belong to a common row and are simultaneously active, and by leaving one element active and deactivating other elements among elements of said masked request matrix which belong to a common column and are simultaneously active;

a step of generating a final allocation matrix by adding said allocation matrix and said priority reservation allocation matrix together; and a step of connecting an input port and output port which correspond to an active element in said final allocation matrix.

* * * * *